June 6, 1961 J. L. LAUER 2,987,456
FLASH PHOTOLYSIS PROCESS
Filed July 27, 1959
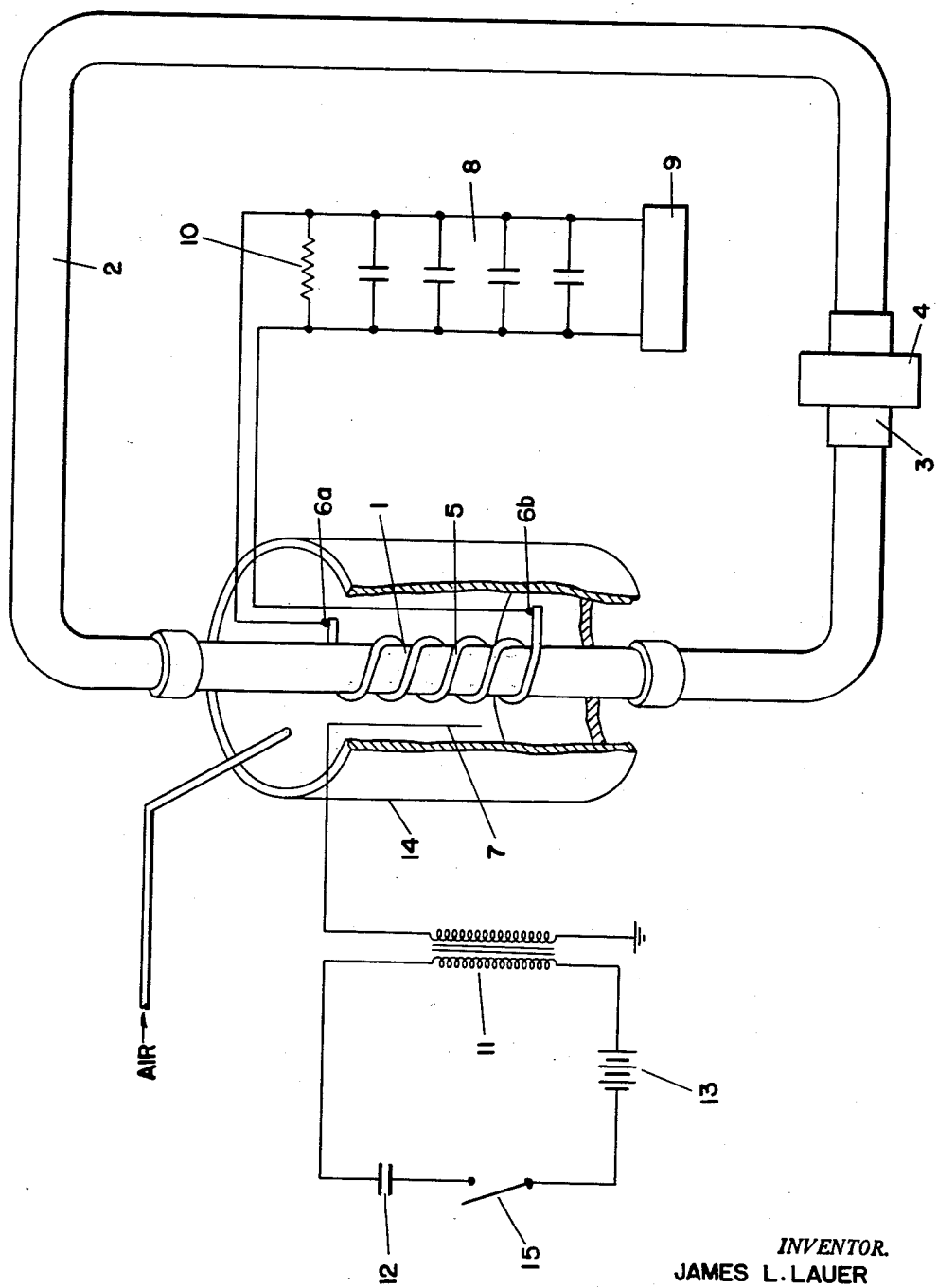
INVENTOR.
JAMES L. LAUER
BY Robert O. Spindle
ATTORNEY

United States Patent Office 2,987,456
Patented June 6, 1961

2,987,456
FLASH PHOTOLYSIS PROCESS
James L. Lauer, Philadelphia, Pa., assignor to Sun Oil Company, Philadelphia, Pa., a corporation of New Jersey
Filed July 27, 1959, Ser. No. 829,865
2 Claims. (Cl. 204—157)

This invention relates to a method for removing hydrogen sulfide from refinery gases and more particularly relates to the use of flash photolysis for obtaining free sulfur and carbon disulfide from hydrogen sulfide.

In the prior art hydrogen sulfide has been removed by the use of various reagents such as organic amines, glycols and tripotassium phosphate.

It is one of the objects of this invention to provide a new method for removing hydrogen sulfide from methane and from saturated hydrocarbon gases such as natural gas and refinery gas without resorting to the use of chemical reagents.

Another object of my invention is to provide a method of making sulfur and carbon disulfide.

In general, I accomplish the objects of the invention by subjecting a saturated hydrocarbon gas containing hydrogen sulfide to intense flash irradiation with ultraviolet light. Only a few milliseconds elapse in exposing $H_2S$ to photochemical energy and therefore very few side reactions take place. At least 105 kilocalories of energy are required to obtain the dissociation of the $H_2S$. While a greater amount of energy may be applied per flash, conversions are not proportionally increased with application of more photochemical energy, therefore equipment which provides an energy output of 105 to 150 kilocalories is suitable for this process.

The invention will be further described with reference to the attached drawing which illustrates one mode of carrying out the process.

A circulation system consisting of a quartz tube reaction zone 1 and circulating tube 2, together with joining materials, such as flexible hose, is filled with methane gas containing 50% $H_2S$. The gas is continuously circulated at atmospheric pressure or slightly higher and ambient temperature by means of pump 4. In this case the pump is operated by peristallic action on flexible hose 3. By pumping in this way contamination of the gas by pump lubricants is avoided. Reference numeral 5 denotes a xenon-filled helical photoflash lamp surrounding the sample container reaction zone. The flash lamp has tungsten electrodes 6a and 6b and a trigger electrode 7. Four condenser banks in parallel at 8, supply the discharge current. Each condenser bank contains four parallel connected condensers of 25 microfarads each so that the total capacity is 400 microfarads. At least 300 microfarads are necessary and 300 to 500 microfarads is a suitable range. Power supply 9 supplies sufficient direct current voltage to obtain a maximum condenser voltage of 4000 volts and charges at rates up to 10 milliamperes. Shunt resistor 10 provides for bleeding off residual condenser charge after the lamp has been fired. The trigger circuit consists of the coil 11, capable of generating up to 10,000 volts in the secondary when the battery 13 is charged. 0.3 microfarad condenser 12 is discharged through the switch 15 in the primary. The lamp is enclosed by an aluminum reflector 14 and dry air is blown through the space between the reaction zone and the helix to keep the latter cool. With cooling it is possible to flash at two minute intervals. In calibrating, uranyl oxalate actinometry was used to measure the light output of each lamp flash and flash duration was measured with an oscilloscope.

The circulating gas was subjected at ambient temperature to five flashes obtained on discharging 400 microfarads at 4000 volts within four milliseconds per flash. Based on the $H_2S$ in the original mixture, the conversion was 1.5% to $CS_2$ and 11% to free sulfur. Analysis of outlet gas indicated that 90.4% of the original $H_2S$ remained.

Flashing may be continued to reduce the amount of $H_2S$ to its equilibrium value (about 20%); however, $CS_2$ in an amount of about one tenth that of free sulfur will always be formed, the exact proportion of $CS_2/S$ depending on the initial $CH_4/H_2S$ ratio.

While methane was the gas treated in the above example, the method may obviously be applied to natural gas and refinery gases since these are principally methane, ethane and propane.

I claim:

1. A process for the conversion of hydrogen sulfide in refinery gas to sulfur and carbon disulfide comprising subjecting the said gas to intense flash irradiation with ultraviolet light sufficient to provide at least 105 kilocalories of energy.

2. A process for the conversion of hydrogen sulfide in a mixture of methane, ethane and propane to sulfur and carbon disulfide comprising circulating the said mixture at ambient pressure and temperature through a heat resistant light transmitting conduit surrounded by a source of ultraviolet light, subjecting the said mixture to flash irradiation sufficient to provide at least 105 kilocalories of energy, and recovering the sulfur and carbon disulfide so formed.

References Cited in the file of this patent
UNITED STATES PATENTS
2,788,262    Adcock et al. _____ Apr. 9, 1957

OTHER REFERENCES
Ellis et al.: The Chemical Action of Ultraviolet Rays, 1941, pages 329, 330, 355 and 393.